United States Patent [19]

Soga et al.

[11] Patent Number: 5,270,417

[45] Date of Patent: Dec. 14, 1993

[54] METHOD OF MANUFACTURING A POLYACETYLENE CONJUGATE POLYMER

[75] Inventors: Mamoru Soga, Osaka; Kazufumi Ogawa, Hirakata, both of Japan

[73] Assignee: Matsushita Electric Industrial Co., Ltd., Kadoma, Japan

[21] Appl. No.: 993,022

[22] Filed: Dec. 18, 1992

[30] Foreign Application Priority Data

Jan. 14, 1992 [JP] Japan .................. 4-005226

[51] Int. Cl.$^5$ .............................. C08F 38/02
[52] U.S. Cl. .................. 526/279; 427/333; 427/336; 427/341; 427/443.1; 427/443.2; 526/90
[58] Field of Search ............ 427/333, 336, 341, 443.1, 427/443.2; 526/279, 285

[56] References Cited

U.S. PATENT DOCUMENTS 5,008,127  4/1991  Ogawa .................. 427/36
5,057,339  10/1991  Ogawa .................. 427/340

OTHER PUBLICATIONS

Hideki Shirakawa and Sakuji Ikeda, "Preparation and Morphology of As-Prepared and Highly Stretch--Aligned Polyacetylene", Synthetic Metals (1979/1980) 175–184.

*Primary Examiner*—Joseph L. Schofer
*Assistant Examiner*—R. H. Delmendo
*Attorney, Agent, or Firm*—Fish & Richardson

[57] ABSTRACT

Disclosed is a method of manufacturing a polyacetylene type superlong conjugate polymer that is stable in an atmosphere containing oxygen. The polymer is made by chemically adsorbing a chemical adsorption substance containing an acetylene group and a chlorosilyl group to a substrate surface, and polymerizing the acetylene group in a solvent containing a Ziegler-Natta catalyst. In a non-aqueous organic solvent, a chemical adsorption substance containing an acetylene group and a chlorosilyl group is dissolved. For example, a substrate is immersed in $\omega$-nonadecylinoic trichlorosilane, and a monomolecular film is formed on the substrate by chemical adsorption. The substrate is then immersed in an organic solvent containing a Ziegler-Natta catalyst, and the acetylene group of the monomolecular film is polymerized.

9 Claims, 2 Drawing Sheets

METHOD OF MANUFACTURING A POLYACETYLENE CONJUGATE POLYMER

FIELD OF THE PRESENT INVENTION

The invention relates to a method of manufacturing a polyacetylene type conjugate polymer or polyacetylene type superlong conjugate polymer. More particularly, the invention relates to an organic composition containing a polyacetylene bond which is useful for electric materials or the like, and demonstrates conductive or nonlinear optical effects.

BACKGROUND OF THE INVENTION

Polymer of acetylene derivatives, which possess a one-dimensional main chain having a $\pi$-electronic conjugate system and are characterized by the conductivity and nonlinear optical effect, are widely studied as electronic functional material.

A method of manufacturing polyacetylene, by polymerizing acetylene gas with a Ziegler-Natta catalyst, proposed by Shirakawa et al., is well known (Synthetic Metals, vol. 1, p. 175, 1979/1980, Switzerland).

Polyacetylene derivatives used at the present are, however, unstable against heat, pressure or ultraviolet rays, in an atmosphere containing oxygen. Stabilization studies are being conducted, but effective methods for stabilizing polyacetylene derivatives polymer have not proved satisfactory.

SUMMARY OF THE INVENTION

The invention is devised in the light of such problems in the prior art. It is therefore, an object of this invention achieve method of manufacturing a polyacetylene type conjugate polymer, or superlong conjugate polymer, that is stable in an atmosphere containing oxygen.

An object of the invention is to provide a method of manufacturing a polyacetylene conjugate polymer comprising contacting a silane based surface adsorbent having an acetylene or diacetylene group and a reactive silane or silanol group at one end with a substrate surface to initiate a condensation reaction and form a chemical adsorption film on the substrate surface, and contacting the chemical adsorption film with an organic solvent containing a Ziegler-Natta catalyst, for polymerizing the acetylene or diacetylene group of the chemical adsorption film.

It is preferable in this invention that the chlorosilane based adsorbent or an alkoxyl silane based adsorbent is used as the silane based surface adsorbent and a dehydrochlorination reaction or a de-alcohol reaction is carried out as the condensation reaction.

It is preferable in this invention that the after the dehydrochlorination reaction, unreacted chlorosilane based adsorbent on the surface of the substrate is washed and removed with a non-aqueous organic solution and reacted with water to form a monomolecular adsorbed film.

It is preferable in this invention to provide a method of manufacturing a polyacetylene conjugate polymer comprising contacting a substrate surface with a chemical adsorption substance in a non-aqueous organic solvent, wherein the chemical adsorption substance contains an acetylene or diacetylene group and an —Si—Cl group, to form a chemical adsorption film on the substrate surface, contacting the chemical adsorption film with an organic solvent containing a Ziegler-Natta catalyst, and polymerizing the acetylene or diacetylene group of the chemical adsorption film.

It is preferable in this invention that the chemical adsorption film is a monomolecular film or a monomolecular cumulative film.

It is preferable in this invention that the —Si(CH$_3$)$_3$ is bonded with the acetylene group or diacetylene group.

It is preferable in this invention that the adsorbed film having the —Si(CH$_3$)$_3$ group and the acetylene group or diacetylene group is treated with an alkaline aqueous solution.

It is preferable in this invention that the Ziegler-Natta catalyst is prepared by treating a transition metal compound of group IV or VIII in the periodic table with an organic metal compound of an element of group I or IIIa in the periodic table.

It is preferable in this invention that the reaction for forming a chemical adsorption film on the substrate surface is a dehydrochlorination reaction.

According to the embodiments of the present invention, using a straight-chain hydrocarbon derivative possessing an —Si—Cl group at one end, a chemical adsorption film may be formed at a high density (maximum density filling) on the substrate surface by chemical adsorption. Furthermore, by making the surface of the chemical adsorption film hydrophilic by emitting high energy rays in a gas containing oxygen, a cumulative, monomolecular film may be formed. Therefore, chemically adsorbing a part of the straight-chain hydrocarbon by using a substance containing at least one acetylene group, a chemical adsorption film can be formed from an acetylene derivative that is on the order of scores of angstroms (several nanometers) in thickness. The film can be formed at a high density, and several layers of cumulative films may be obtained easily.

When the monomolecular films accumulated by this method are immersed in an organic solvent containing a Ziegler-Natta catalyst, and the acetylene group portions of the monomolecular films are polymerized, a polyacetylene of an ultrahigh molecular weight with a very long conjugate system is formed at a high density. Accordingly, it is resistant to attacks of oxygen, and a stable polyacetylene is formed even in the atmosphere containing oxygen. That is, by polymerizing the molecules of an acetylene derivative by using a Ziegler-Natta catalyst in a state of high density and maintaining a specific orientation, a polymer (superlong conjugate polymer) is produced that is stable against heat, pressure or ultraviolet rays, in an atmosphere containing oxygen in an ultrahigh molecular weight in a straight chain with a continuous conjugate system.

According to a preferable embodiment of the invention in which the chemical adsorption film is a monomolecular film or a monomolecular cumulative film, an ultrathin chemical adsorption film at the nanometer level of thickness can be formed uniformly.

Moreover, according to a preferred embodiment of the invention in which —Si(CH$_3$)$_3$ is bonded to the acetylene group of diacetylene group by treating with an alkaline aqueous solution to stabilize the molecule end to form the chemical adsorption film, the —Si(CH$_3$)$_3$ group can be eliminated. As a result, the acetylene group or diacetylene group may be exposed at the outermost surface of the chemical adsorption film.

In addition, according to the embodiment of the invention in which the Ziegler-Natta catalyst is prepared by treating a transition metal compound of group IV or VIII in the periodic table with an organic metal compound of an element of group I or IIIa in the periodic table, efficient catalyst activity is achieved.

DETAILED DESCRIPTION OF THE INVENTION

The invention is described in detail below by referring to some of the embodiments thereof. The invention is, however, not limited to these embodiments alone.

Figure 1:
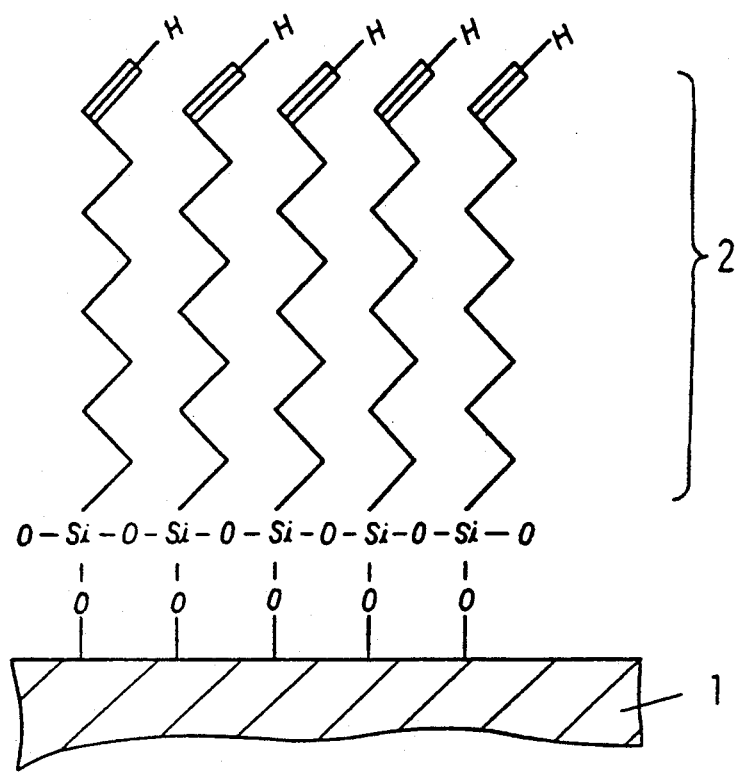
FIG. 1 is a conceptual molecular diagram of a substrate having one layer of an acetylene adsorption film according to an embodiment of the invention.

An embodiment of the invention is shown in FIG. 1. In a non-aqueous organic solvent, a chemical absorbent containing an acetylene group at one molecule end and a trichlorosilyl group at the other molecule end is dissolved. A substrate 1 possessing —OH group is immersed in the solvent to form a hydrophilic substrate having $SiO_2$ groups. The $SiO_2$ groups are formed when the —SiCl groups and the —OH groups on the substrate surface react to induce a dehydrochlorination reaction. Consequently, when unreacted matter is removed by washing with a non-aqueous solution, a monomolecular film 2 expressed in the following formula is formed on the substrate surface (FIG. 1)

[Formula 1]

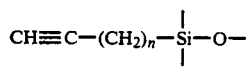

It was confirmed by FTIR (fourier transform infrared spectroscopy) that the monomolecular film 2 expressed by Formula 1 was formed on the substrate surface. Besides, the adsorption films accumulated in the above method were confirmed to be insoluble in an alcohol solvent.

Figure 2:
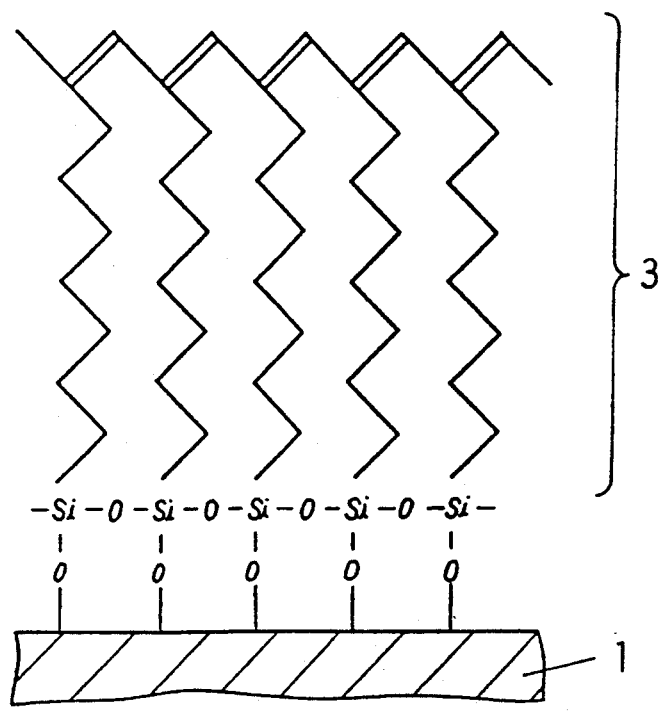
FIG. 2 is a conceptual molecular diagram of a substrate having a polyacetylene adsorption film polymerizing an acetylene adsorption film according to an embodiment of the invention.

In an organic solvent containing a Ziegler-Natta catalyst, when the substrate forming one layer of a monomolecular film is immersed, a polymerization reaction takes place, and polyacetylene 3, as shown in FIG. 2, is produced. The production of polyacetylene was verified by an FTIR spectrum.

Figure 3:
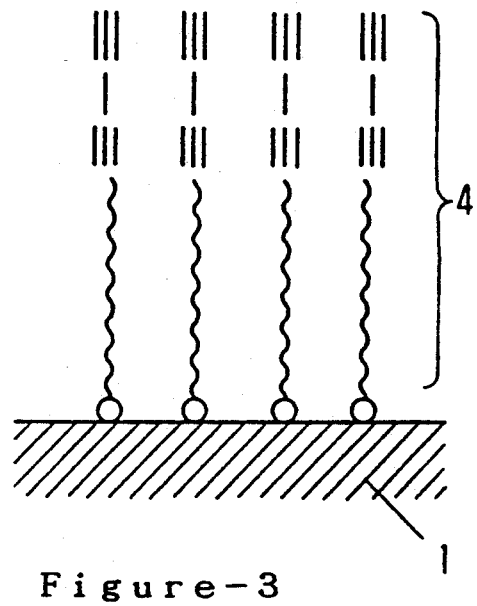
FIG. 3 is a conceptual molecular diagram of a substrate having one layer of a diacetylene adsorption film according to another embodiment of the invention.

FIG. 3 is a diagram showing the method of manufacturing polyacetylene using a compound containing diacetylene group and a trichlorosilyl group at the ends of the compound.

Figure 4:
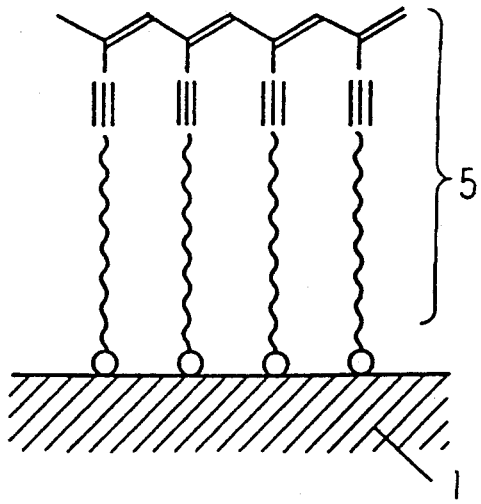
FIG. 4 is a conceptual molecular diagram of a substrate having a polyacetylene adsorption film polymerizing a diacetylene adsorption film according to another embodiment of the invention.

In a non-aqueous organic solvent, a compound containing an diacetylene group and a trichlorosilyl group at the ends of the compound is dissolved. A substrate possessing —OH groups is immersed into the solvent to form a hydrophilic substrate having $SiO_2$ groups. The $SiO_2$ groups are formed when the —OH groups on the substrate surface react with the —SiCl groups to induce a dehydrochlorination reaction. When unreacted matter is removed by washing with a non-aqueous solution, a monomolecular film 4 as shown in Formula 2, is formed on the substrate surface (FIG. 4).

[Formula 2]

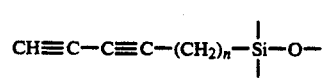

It was confirmed by FTIR that the monomolecular film 4 shown in Formula 2 was formed on the substrate surface. At the same time, the absorption films accumulated in this method were confirmed to be insoluble in an alcohol solvent. In an organic solvent containing a Ziegler-Natta catalyst, when the substrate forming one layer of a monomolecular film is immersed, a polymerization reaction takes place, and polyacetylene 5, as shown in FIG. 4, is produced. The production of polyacetylene was verified by an FTIR spectrum.

As the substance containing an acetylene group and a —Si—Cl group usable in the invention, for example, the following compounds may be used.

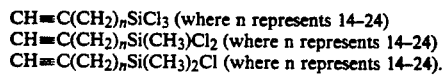

As the substance containing diacetylene group and —Si—Cl group usable in the invention, for example, the following compounds may be used.

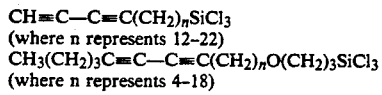

For stabilizing the molecule ends, a substance having a —SiMe$_3$ group in the acetylene group may be used. Examples of such compound include the following.

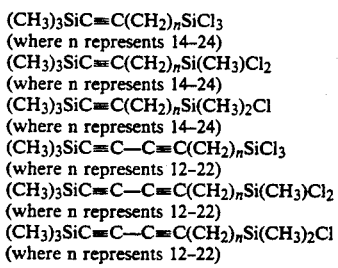

In this case, when immersed in a 10 wt. % KOH aqueous solution after adsorption, the —Si(CH$_3$)$_3$ group is dissociated, and similarly the monomolecular films of Formula 3 and Formula 4 may be formed.

[Formula 3]

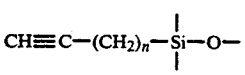

[Formula 4]

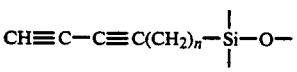

The Ziegler-Natta catalyst usable in the invention may be obtained by reaction of a transition metal compound of group IV or VIII in the periodic table with an organic metal compound of an element of group I or IIIa in the periodic table.

As such organic metal compounds, for example, an alkyl aluminum compound, a zinc alkyl compound and a lithium alkyl compound may be used. As the transition metal compound of group IV or VIII, alkoxide or halide may be used. Examples include the following.

$$Al(C_nH_{2n+1})_3/Ti(OC_mH_{2m+1})_4$$
$$Al(C_nH_{2n+1})_3/TiCl_4$$
$$Al(C_nH_{2n+1})_3/TiCl_3$$
$$Al(C_nH_{2n+1})_3/VCl_3$$
$$Al(C_nH_{2n+1})_3/MoCl_5$$
$$Zn(C_nH_{2n+1})_2/Ti(OC_mH_{2m+1})_4$$
$$LiC_nH_{2n+1}/Ti(OC_mH_{2m+1})_4$$

(where n represents an integer from 1 to 10, and m represents an integer from 2 to 10)

The invention is further described below by referring to practical examples.

EXAMPLE 1

An Si substrate forming an oxide film ($SiO_2$) of 3 inches in diameter was immersed in a $10^{-2}$ mol/liter solution (80 wt. % hexadecane, 12 wt. % carbon tetrachloride, and 8 wt. % chloroform) of a reaction chemical adsorption substance, ω-nonadecylinoic trichlorosilane (NCS) as shown in Formula 5, for 1 hour at room temperature in a nitrogen atmosphere.

$$CH\equiv C(CH_2)_{17}SiCl_3 \qquad \text{[Formula 5]}.$$

The substrate was then washed in chloroform, and the unreacted chemical adsorption substance was removed. The substrate was later washed in purified water, and a monomolecular film was formed on the Si surface. Subsequently, the Si substrate forming the monomolecular film was immersed and polymerized in a mixed solvent composed of a $5\times10^{-2}$ mol/liter solution of triethyl aluminum, and a $2.5\times10^{-2}$ mol/liter solution (toluene) of tetrabutyl titanate. After washing in toluene for two hours, a sample was obtained.

EXAMPLE 2

A similar experiment was conducted except that ω-nonadecylinoic trichlorosilane in Example 1 was replaced by the reaction chemical adsorption substance, 1-(trimethylsilyl)-ω-nonadecylinoic trichlorosilane (TMS-NCS), as shown in Formula 6.

$$SiMe_3-C\equiv C(CH_2)_{17}-SiCl_3 \qquad \text{[Formula 6]}$$

EXAMPLE 3

A similar experiment was conducted by replacing ω-nonadecylinoic trichlorosilane in Example 1 with the reaction chemical adsorption substance shown in Formula 7.

$$CH\equiv C(CH_2)_{14}-Si(CH_3)Cl_2 \qquad \text{[Formula 7]}$$

EXAMPLE 4

A similar experiment was conducted by replacing ω-nonadecylinoic trichlorosilane in Example 1 with the reaction chemical adsorption substance shown in Formula 8.

$$CH\equiv C(CH_2)_{24}-Si(CH_3)_2Cl \qquad \text{[Formula 8]}$$

EXAMPLE 5

A similar experiment was conducted by replacing ω-nonadecylinoic trichlorosilane in Example 1 with the reaction chemical adsorption substance shown in Formula 9.

$$CH_3(CH_2)_3-C\equiv C-C\equiv C(CH_2)_6O(CH_2)_3SiCl_3 \qquad \text{[Formula 9]}$$

EXAMPLE 6

A similar experiment was conducted by replacing ω-nonadecylinoic trichlorosilane in Example 1 with the reaction chemical adsorption substance shown in Formula 10.

$$HC\equiv C-C\equiv C(CH_2)_6O(CH_2)_{19}SiCl_3 \qquad \text{[Formula 10]}$$

EXAMPLE 7

A similar experiment was conducted by replacing the mixed catalyst in Example 1 with a mixed catalyst composed of a $5\times10^{-2}$ mol/liter solution (toluene) of trioctyl aluminum and a $2.5\times10^{-2}$ mol/liter solution (toluene) of tetrabutyl titanate.

EXAMPLE 8

A similar experiment was conducted by replacing the mixed catalyst in Example 1 with a mixed catalyst composed of a $5\times10^{-2}$ mol/liter solution (toluene) of triethyl aluminum and a $2.5\times10^{-2}$ mol/liter solution (toluene) of tetrachlorotitanium.

EXAMPLE 9

A similar experiment was conducted by replacing the mixed catalyst in Example 1 with a mixed catalyst composed of a $5\times10^{-2}$ mol/liter solution (toluene) of triethyl aluminum and a $2.5\times10^{-2}$ mol/liter solution (toluene) of tetrachlorovanadium.

EXAMPLE 10

A similar experiment was conducted by replacing the mixed catalyst in Example 1 with a mixed catalyst composed of a $5\times10^{-2}$ mol/liter solution (toluene) of diethyl zinc and a $2.5\times10^{-2}$ mol/liter solution (toluene) of tetrabutyl titanate.

EXAMPLE 11

A similar experiment was conducted by replacing the mixed catalyst in Example 1 with a mixed catalyst composed of a $5\times10^{-2}$ mol/liter solution (toluene) of butyl lithium and a $2.5\times10^{-2}$ mol/liter solution (toluene) of tetrabutyl titanate.

COMPARATIVE EXAMPLE 1

A polyacetylene film was obtained by polymerizing acetylene gas using a mixed catalyst composed of a $5\times10^{-2}$ mol/liter solution (toluene) of triethyl aluminum and a $2.5\times10^{-2}$ mol/liter solution (toluene) of tetrabutyl titanate.

Samples of Examples 1 to 11 and Comparison 1 were let stand in a 60° C. atmosphere for 30 days, and the FITRs before and after standing were compared. In the comparative sample, an absorption peak was observed at 3450 cm$^{-1}$, and oxidation was progressed, but there was no change in FTIR in the samples of the embodiments of this invention and oxidation was not initiated.

In Example 2, a similar experiment was conducted by replacing the substrate with a glass plate. After forming a monomolecular film of polyacetylene, iodine was doped after four hours in a vapor phase. The conductivity was measured, and the result was $5 \times 10^{-4}$ S/cm.

In the foregoing embodiments, the method of polymerizing by forming a mono-layer chemical adsorption film is shown, but a polymerization reaction may be conducted after laminating multiple layers of the adsorption film. Formation of the adsorption film and the polymerization reaction may be done alternately. The multilayer molecular film of polyacetylene can be similarly manufactured.

As described herein, according to the embodiments of the invention, it is theoretically possible to manufacture a straight-chain polyacetylene with an ultrahigh molecular weight having a conjugate system continuously extending several millimeters or more than several centimeters, which is extremely effective in fabricating devices that make use of nonlinear optical effects. By further optimizing the variety and manufacturing conditions of materials such as an acetylene and diacetylene derivative monomer, it is possible to manufacture a stable straight-chain polyacetylene with an ultrahigh molecular weight having the conjugate system continuously extending scores of centimeters or several meters or even longer. In this method, organic superconductive substances not requiring cooling may be manufactured.

By the method of the invention, as explained above, it is possible to manufacture a stable polymer of a polyacetylene that is excellent in conductivity and nonlinear optical effects, efficiently in an atmosphere containing oxygen. Moreover, by polymerizing an acetylene derivative using a Ziegler-Natta catalyst in a high density state and keeping a uniform orientation, a polymer (superlong conjugate polymer) which is stable against heat, pressure or ultraviolet rays may be formed in an atmosphere containing oxygen, in the straight chain of a continuous conjugate system, having an ultrahigh molecular weight.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A method of manufacturing a polyacetylene conjugate polymer comprising contacting a compound having an acetylene or diacetylene group and a reactive silane or silanol group at one end with a substrate surface to initiate a condensation reaction and form a chemical adsorption film on the substrate surface, and contacting the chemical adsorption film with an organic solvent containing a Ziegler-Natta catalyst, for polymerizing the acetylene or diacetylene group of the chemical adsorption film.

2. The method of manufacturing a polyacetylene conjugate polymer of claim 1, wherein a chlorosilane containing or alkoxyl silane containing compound is used as the compound having an acetylenic or diacetylenic group and a reactive silane or silanol group and a dehydrochlorination reaction or a de-alcohol reaction is carried out as the condensation reaction.

3. The method of manufacturing a polyacetylene conjugate polymer of claim 2, wherein after the dehydrochlorination reaction, the unreacted chlorosilane containing compound on the surface of the substrate is washed and removed with a non-aqueous organic solution and reacted with water to form a monomolecular adsorbed film.

4. A method of manufacturing a polyacetylene conjugate polymer comprising contacting a substrate surface with a chemical adsorption substance in a non-aqueous organic solvent, wherein the chemical adsorption substance contains an acetylene or diacetylene group and an —Si—Cl group, to form a chemical adsorption film on the substrate surface, contacting the chemical adsorption film with an organic solvent containing a Ziegler-Natta catalyst, and polymerizing the acetylene or diacetylene group of the chemical adsorption film.

5. The method of manufacturing a polyacetylene conjugate polymer of claim 4, wherein the chemical adsorption film is a monomolecular film or a monomolecular cumulative film.

6. The method of manufacturing a polyacetylene conjugate polymer of claim 4, wherein —Si (CH$_3$)$_3$ is bonded with the acetylene group or diacetylene group.

7. The method of manufacturing a polyacetylene conjugate polymer of claim 6, wherein the adsorbed film having the —Si (CH$_3$)$_3$ group and the acetylene group or diacetylene group is treated with an alkaline aqueous solution.

8. The method of manufacturing a polyacetylene conjugate polymer of claim 4, wherein the Ziegler-Natta catalyst is prepared by treating a transition metal compound of group IV or VIII in the periodic table with an organic metal compound of an element of group I or IIIa in the periodic table.

9. The method of manufacturing a polyacetylene conjugate polymer of claim 4, wherein the reaction for forming a chemical adsorption film on the substrate surface is a dehydrochlorination reaction.

* * * * *